United States Patent
Cherian et al.

(10) Patent No.: US 9,210,527 B2
(45) Date of Patent: Dec. 8, 2015

(54) METHOD AND APPARATUS FOR PROVIDING UNIFORM MACHINE-TO-MACHINE ADDRESSING

(75) Inventors: George Cherian, San Diego, CA (US); Jun Wang, La Jolla, CA (US); Ravindra Manohar Patwardhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 13/180,421

(22) Filed: Jul. 11, 2011

(65) Prior Publication Data

US 2012/0016942 A1  Jan. 19, 2012

Related U.S. Application Data

(60) Provisional application No. 61/363,999, filed on Jul. 13, 2010.

(51) Int. Cl.
G06F 15/16 (2006.01)
H04W 4/00 (2009.01)
H04W 4/18 (2009.01)

(52) U.S. Cl.
CPC ............... *H04W 4/00* (2013.01); *H04W 4/005* (2013.01); *H04W 4/18* (2013.01)

(58) Field of Classification Search
CPC ..... H04L 67/02; H04L 69/08; H04L 67/2823; H04L 69/16; G06F 17/30896
USPC .......................................... 709/206; 455/466
See application file for complete search history.

(56) References Cited

U.S. PATENT DOCUMENTS

| | | | |
|---|---|---|---|
| 6,393,297 | B1 | 5/2002 | Song |
| 6,873,627 | B1 | 3/2005 | Miller et al. |
| 7,774,008 | B2 | 8/2010 | Benaouda et al. |
| 8,316,152 | B2 | 11/2012 | Geltner et al. |
| 2002/0026500 | A1* | 2/2002 | Kanefsky et al. ............. 709/219 |
| 2002/0136224 | A1* | 9/2002 | Motley .......................... 370/401 |

(Continued)

FOREIGN PATENT DOCUMENTS

JP 2004129079 A 4/2004
JP 2006261757 A 9/2006

(Continued)

OTHER PUBLICATIONS

Sun et al., "*A general M2M device model*" Beijing University of Posts and Telecommunications, Beijing, Aug. 2010.

(Continued)

*Primary Examiner* — Brian J Gillis
*Assistant Examiner* — Juan C Turriate Gastulo
(74) *Attorney, Agent, or Firm* — Anthony R. Morris

(57) ABSTRACT

An apparatus and method for providing uniform addressing for Machine-to-machine (M2M) services, including receiving by a first machine-to-machine (M2M) module a content from a first machine-to-machine (M2M) device using a first format, wherein the content is addressed for transmission to a second M2M device; converting the received content to a second format for transmission to a second M2M module, wherein the second M2M module is operable to convert the received content back to the first format for transmission to the second M2M device; and transmitting the converted content to the second M2M device through the second M2M module.

50 Claims, 11 Drawing Sheets

(56) References Cited

U.S. PATENT DOCUMENTS

| | | |
|---|---|---|
| 2004/0116153 A1* | 6/2004 | Kaminski et al. .......... 455/552.1 |
| 2005/0025125 A1* | 2/2005 | Kwan ........................... 370/352 |
| 2006/0227738 A1 | 10/2006 | Nakajima et al. |
| 2008/0002647 A1* | 1/2008 | Laroia et al. .................. 370/338 |
| 2008/0153521 A1* | 6/2008 | Benaouda et al. ............ 455/466 |
| 2009/0097478 A1* | 4/2009 | Didcock et al. ............... 370/355 |
| 2009/0147718 A1 | 6/2009 | Liu et al. |
| 2009/0161624 A1* | 6/2009 | Johnson et al. ............... 370/331 |
| 2010/0202454 A1* | 8/2010 | Miller et al. .................. 370/390 |
| 2011/0053619 A1 | 3/2011 | Shaheen et al. |
| 2011/0063995 A1 | 3/2011 | Chen et al. |
| 2011/0090794 A1* | 4/2011 | Cherian et al. ................ 370/235 |
| 2011/0098063 A1* | 4/2011 | Richardson .................. 455/466 |
| 2011/0106969 A1 | 5/2011 | Choudhury et al. |
| 2011/0199915 A1* | 8/2011 | Santhanam et al. .......... 370/252 |
| 2013/0078985 A1* | 3/2013 | Savolainen et al. ........... 455/418 |

FOREIGN PATENT DOCUMENTS

| | | |
|---|---|---|
| JP | 2006304273 A | 11/2006 |
| WO | 2006088947 | 8/2006 |

OTHER PUBLICATIONS

International Search Report and Written Opinion—PCT/US2011/043918—ISA/EPO—Oct. 7, 2011.

* cited by examiner

METHOD AND APPARATUS FOR PROVIDING UNIFORM MACHINE-TO-MACHINE ADDRESSING

CLAIM OF PRIORITY UNDER 35 U.S.C. §119

The present Application for Patent claims priority to Provisional Application No. 61/363,999 entitled "Method and Apparatus for Providing Uniform Machine-to-machine Addressing filed Jul. 13, 2010, and assigned to the assignee hereof and hereby expressly incorporated by reference herein.

FIELD

This disclosure relates generally to apparatus and methods for wireless communication. More particularly, the disclosure relates to providing uniform addressing for Machine-to-machine (M2M) services.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of another telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Disclosed is an apparatus and method for providing uniform addressing for Machine-to-Machine (M2M) services. According to one aspect, a method for providing uniform addressing for machine-to-machine (M2M) services, the method including receiving by a first machine-to-machine (M2M) module a content from a first machine-to-machine (M2M) device using a first format, wherein the content is addressed for transmission to a second M2M device; determine the air interface technology that is used to transmit the content, converting the received content to a second format for transmission to a second M2M module, wherein the second M2M module is operable to convert the received content back to the first format for transmission to the second M2M device; and transmitting the converted content to the second M2M device through the second M2M module.

According to another aspect, an apparatus for providing uniform addressing for machine-to-machine (M2M) services, the apparatus comprising a processor and a memory, the memory containing program code executable by the processor for performing the following: receiving by a first machine-to-machine (M2M) module a content from a first machine-to-machine (M2M) device using a first format, wherein the content is addressed for transmission to a second M2M device; converting the received content to a second format for transmission to a second M2M module, wherein the second M2M module is operable to convert the received content back to the first format for transmission to the second M2M device; and transmitting the converted content to the second M2M device through the second M2M module.

According to another aspect, an apparatus for providing uniform addressing for machine-to-machine (M2M) services, the apparatus including means for receiving by a first machine-to-machine (M2M) module a content from a first machine-to-machine (M2M) device using a first format, wherein the content is addressed for transmission to a second M2M device; means for converting the received content to a second format for transmission to a second M2M module, wherein the second M2M module is operable to convert the received content back to the first format for transmission to the second M2M device; and means for transmitting the converted content to the second M2M device through the second M2M module.

According to another aspect, a computer program product, including a computer-readable medium with codes for causing a computer to: receive by a first machine-to-machine (M2M) module a content from a first machine-to-machine (M2M) device using a first format, wherein the content is addressed for transmission to a second M2M device; convert the received content to a second format for transmission to a second M2M module, wherein the second M2M module is operable to convert the received content back to the first format for transmission to the second M2M device; and transmit the converted content to the second M2M device through the second M2M module.

Advantages of the present disclosure may include (a) providing a common addressing scheme for machine-to-machine (M2M) services, independent of the specific M2M air interface details, (b) allowing the user to switch from one air-interface to another air interface without affecting the M2M server and the M2M device, (c) allowing network operator to use the optimum air interface technology based on different conditions such as loading, efficiency etc.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
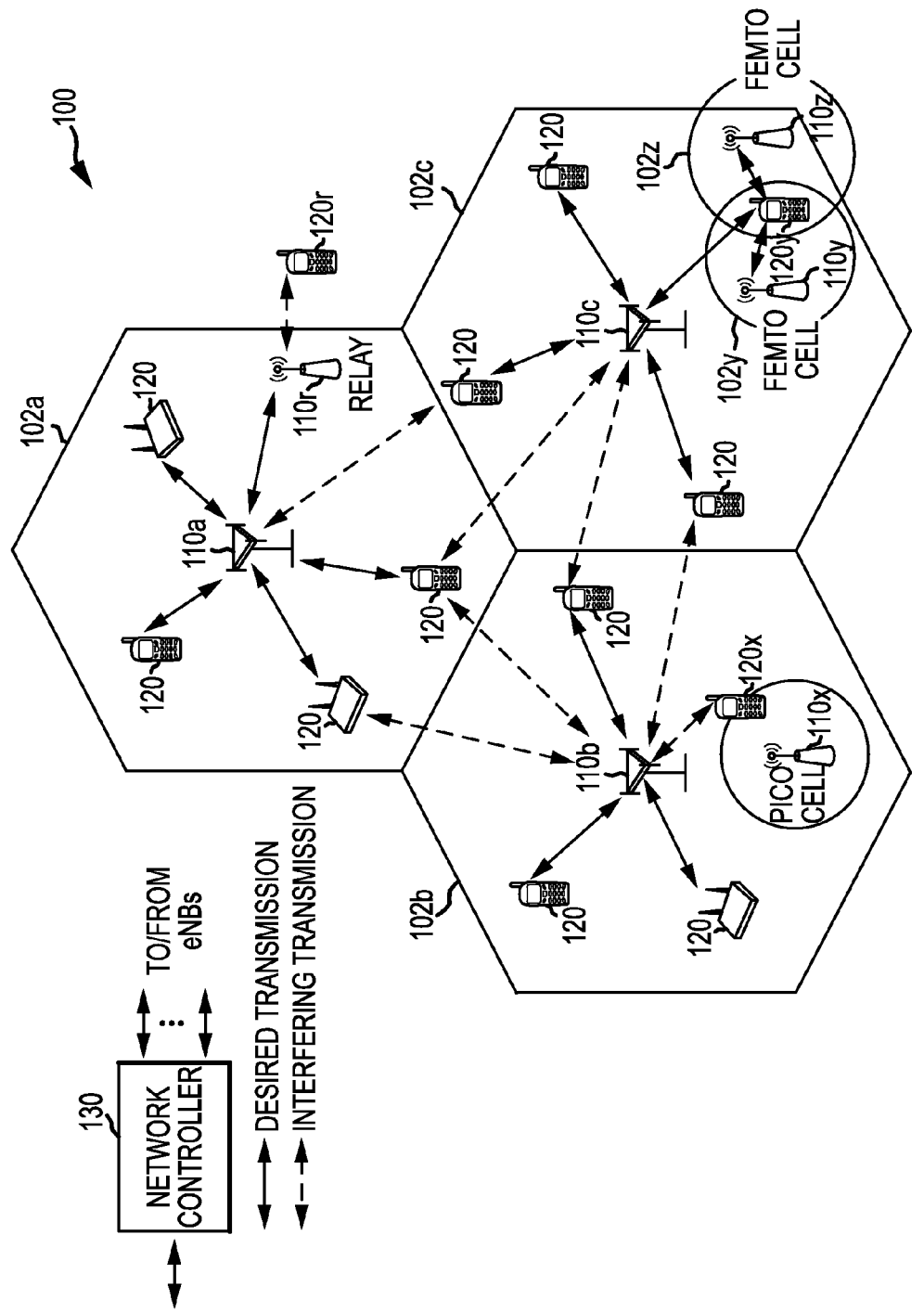
FIG. 1 illustrates an example of a wireless communication network.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE or LTE-A, and LTE or LTE-A terminology may be used in the description without intention of limiting the scope or spirit of the present disclosure to only LTE or LTE-A systems.

FIG. 1 illustrates an example of a wireless communication network 100. In one example, the wireless communication network 100 may be an LTE network and may be operable to facilitate M2M communications. Wireless network 100 may include a number of evolved NodeBs (a.k.a., eNBs or eNodeBs) 110 and other network entities. An eNB may be a station that communicates with the user equipment (UE) and may also be referred to as a base station, a Node B, an access point, etc. Each eNB 110 may provide communication coverage for a particular geographic area. In 3GPP, the term "cell" may refer to a coverage area of an eNB and/or an eNB subsystem serving this coverage area, depending on the context in which the term is used.

In one example, an eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively smaller geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, eNBs 110*a*, 110*b* and 110*c* may be macro eNBs for macro cells 102*a*, 102*b* and 102*c*, respectively. eNB 110*x* may be a pico eNB for a pico cell 102*x*. eNBs 110*y* and 110*z* may be femto eNBs for femto cells 102*y* and 102*z*, respectively. An eNB may support one or multiple (e.g., three) cells. One skilled in the art would understand that the quantity of cells supported is not limited to the quantity illustrated in the examples herein.

Wireless network 100 may also include relay stations. In one example, a relay station receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

In one aspect, the wireless network 100 illustrated in FIG. 1 may be a heterogeneous network that includes eNBs of different types, e.g., macro eNBs, pico eNBs, femto eNBs, relays, etc. These different types of eNBs may have different transmit power levels, different coverage areas, and different impact on interference in wireless network 100. For example, macro eNBs may have a high transmit power level (e.g., 20 Watts) whereas pico eNBs, femto eNBs and relays may have a lower transmit power level (e.g., 1 Watt).

In one aspect, the wireless network 100 may support synchronous or asynchronous operation. For synchronous operation, the eNBs have similar frame timing, and transmissions from different eNBs may be approximately aligned in time. For asynchronous operation, the eNBs have different frame timing, and transmissions from different eNBs may not be aligned in time. The techniques described herein may be used for both synchronous and asynchronous operation.

In one example, a network controller 130 may be coupled to a set of eNBs and provide coordination and control for these eNBs. In one example, the network controller 130 may communicate with eNBs 110 via a backhaul (e.g., core network). eNBs 110 may also communicate with one another directly or indirectly and/or via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. One skilled in the art would understand that the illustrated designated transmission paths and directions are examples only and do not limited the scope or spirit of the present disclosure since other transmission paths and directions may be equally applicable.

Figure 2:
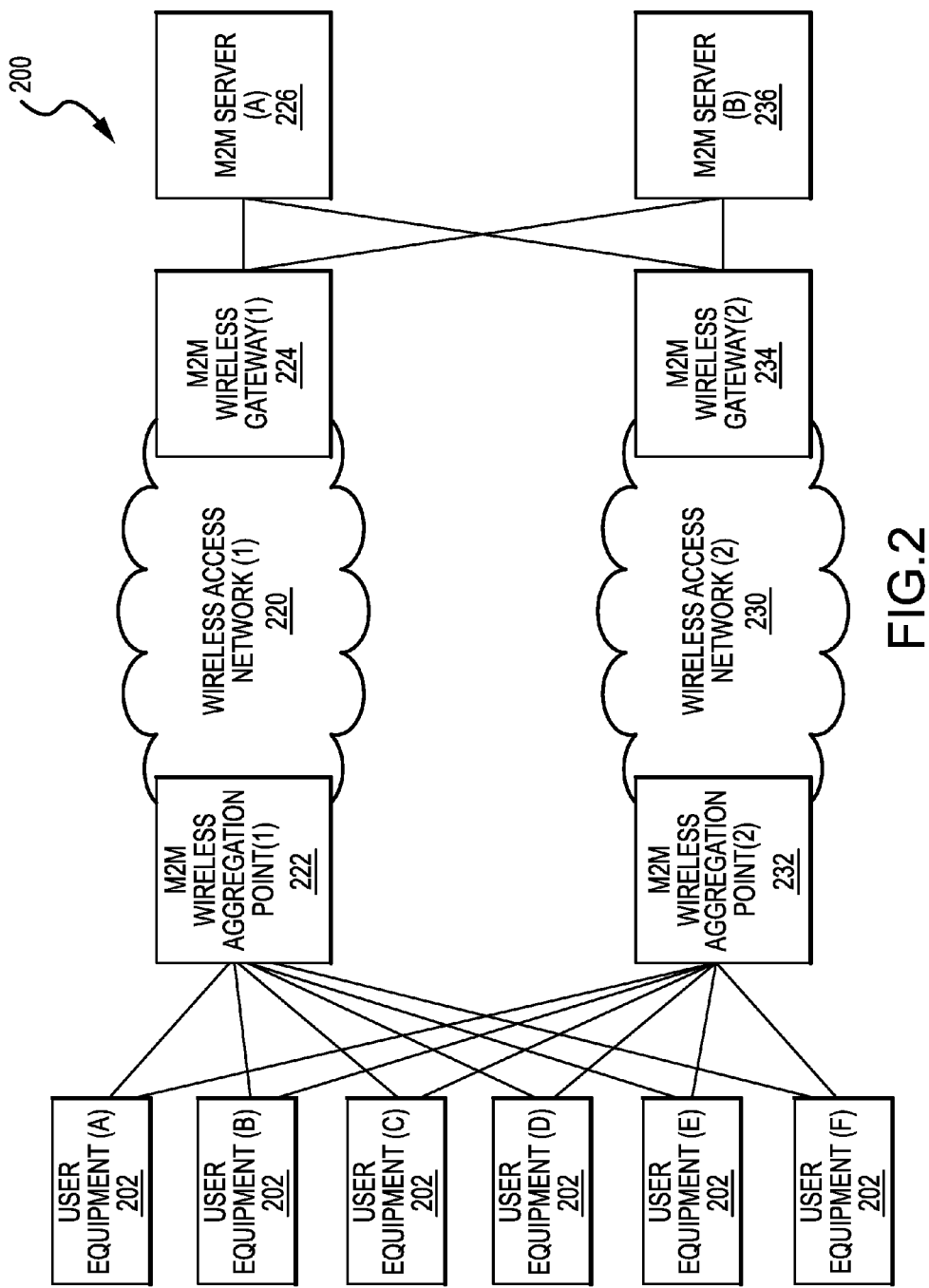
FIG. 2 illustrates an example of a wireless communication system including multiple wide area networks (WANs) implementing a machine-to-machine (M2M) service according to one aspect.

FIG. 2 illustrates an example of a wireless communication system 200 including multiple wide area networks (WANs) (220, 230) implementing a machine-to-machine (M2M) service according to one aspect. The wireless communication system 200 is operable to facilitate M2M communications. Different types of M2M models may be proposed in different applications (e.g., wireless access networks), and as such format fragmentation may lead to different types of M2M devices being used for different services. In one aspect, a M2M network may be implemented which may keep the M2M devices independent of the WAN technology that is used. In such an aspect, the M2M devices and servers may be made independent of the WAN technology that is used. For example, a user may be able to replace a WAN-technology used for backhaul communication, without affecting the M2M devices that may already be installed. In other words, a M2M server and a M2M device may address (e.g., communicate with) each other irrespective of the addressing mechanism (e.g., format) used by WAN technology since the M2M device addressing is not tied with the WAN addressing.

The wireless communication system 200 may include multiple UEs 202 (a.k.a. M2M devices 202), multiple WANs (220, 230), and multiple M2M servers (226, 236) as illustrated in FIG. 2. One skilled in the art would understand that the quantity of UEs, WANs and M2M servers shown in FIG. 2 is for illustration purposes only and should not be construed as limiting.

In one aspect, each WAN (220, 230) may be associated with a M2M wireless aggregation point (222, 232), and a M2M wireless gateway (224, 234). Communications between a UE 202 and a M2M server (226, 236) may be communicated through either of the WANs (220, 230). In one aspect, content from the UE 202 and M2M server (226, 236) may be formatted using an Internet Protocol (IP) format. In one such aspect, the M2M Server obtains the IP address of the UE 202 during M2M registration, using a domain name system (DNS) query.

Furthermore, an IP address may be used for one or more of the reasons stated herein. An interface between a UE 202 and a M2M wireless aggregation point (222, 232) may be treated as a general interface, and as such, may be supported by multiple interface protocols (e.g., Bluetooth, ZigBee, Wifi, etc.), which may use a link identifier defined by a chosen interface protocol. Using an IP format may allow for a migration path for WAN technology to evolve to support M2M devices more efficiently (e.g., power consumption improvements, network resource optimization improvements, etc.) without affecting the UEs 202, services or M2M servers (226, 236). Additionally, a M2M wireless aggregation point (222, 232) may be agnostic about the M2M Device addressing and routing based on an IP address may be more efficient than introducing a new addressing mechanism for routing purpose.

In one aspect, each UE 202 may have a unique device identifier (e.g., extended unique identifier (EUI), mobility equipment identifier (MEID), etc.). Furthermore, the device identifier may be used for authentication of the device between a M2M Server (226, 236) and a UE 202, for example. Once the UE 202 is authenticated, an association is made between IP address and the device identifier. In one aspect, communications may be done using a mobile directory number (MDN) based addressing format. In such an aspect, a M2M server (226, 236) may address a UE 202 directly if a M2M wireless aggregation point (222, 232) is not deployed. In one example in which a M2M wireless aggregation point (222, 232) is deployed, the UE 202 may use a different identifier and the M2M server (226, 236) may use a special device ID to reach the UE 202. In one aspect, changes in a M2M server (226, 236) may result in changes to the special device ID, and as such, migrating the M2M services to data services may be complicated.

In another aspect, IP based formatting may result in a comparatively large overhead for the content to be transmitted. For example, if the IPv6 address is used, then the overhead (40 octet IP header+transmission control protocol/user datagram protocol (TCP/UDP) header) may be large compared to the content. In one aspect, an IPv6 to air-interface ID mapping may be used to reduce overhead. For example, during a session setup the users' IP address may be associated with a users' air-interface identifier (such as unicast access terminal identifier (UATI) or, mobile subscriber integrated services data network (MSISDN) etc. mapped to IPv6 address). As such, when packets are transported, the over air-interface may not include the source-IP address.

To further reduce IP header overhead, in another example, a five-tuple (source-IP-addr, destination-IP-addr, source port-num, dest-port-num, protocol-ID) header may be implemented and may be mapped to an air-interface link ID. As such, when packets are transported, the over air-interface may not include the five-tuple header.

In operation, for communications from a UE 202 to a M2M server 226, 236), if WAN 220 or WAN 230 uses a packet data Service (IP addressing in WAN) then, M2M wireless aggregation point (222, 232) and M2M wireless gateway (224, 234) acts as a router. In another operational aspect, for communications from a UE 202, if the WAN is circuit switched mode (e.g., SMS) is used on WAN, then M2M wireless aggregation point (222, 232) and M2M wireless gateway (224, 234) may convert and reconvert the IP address to WAN specific address mode (e.g., international mobile subscriber identity (IMSI) etc.) and out of the WAN specific address mode. Furthermore, WAN addressing may be used only to address the M2M wireless aggregation point (222, 232), and many M2M-IP-addresses for multiple UEs 202 may be mapped to a single Media Access Control (MAC) address.

The WAN (220) may also consist of more than one air interface technology (for example, WAN may represent the combination of a circuit switched network and a packet network). The M2M Wireless Aggregation Point (222) may be reachable by either one, or all of the technologies represented in WAN (220). When the M2M Wireless Gateway (224) receives a packet from the M2M server (226) that is destined for an M2M device (also represented as User Equipment (202)), the M2M Wireless Gateway (224) determines the optimum air interface technology. Determination of optimum air interface technology includes, but not limited to (a) whether the device has a packet data connection already setup, (b) network loading conditions of each of the air interface technology, (c) efficiency of delivery, (d) policy on which air interface technology is preferable, (e) cost of using a particular technology.

Figure 3:
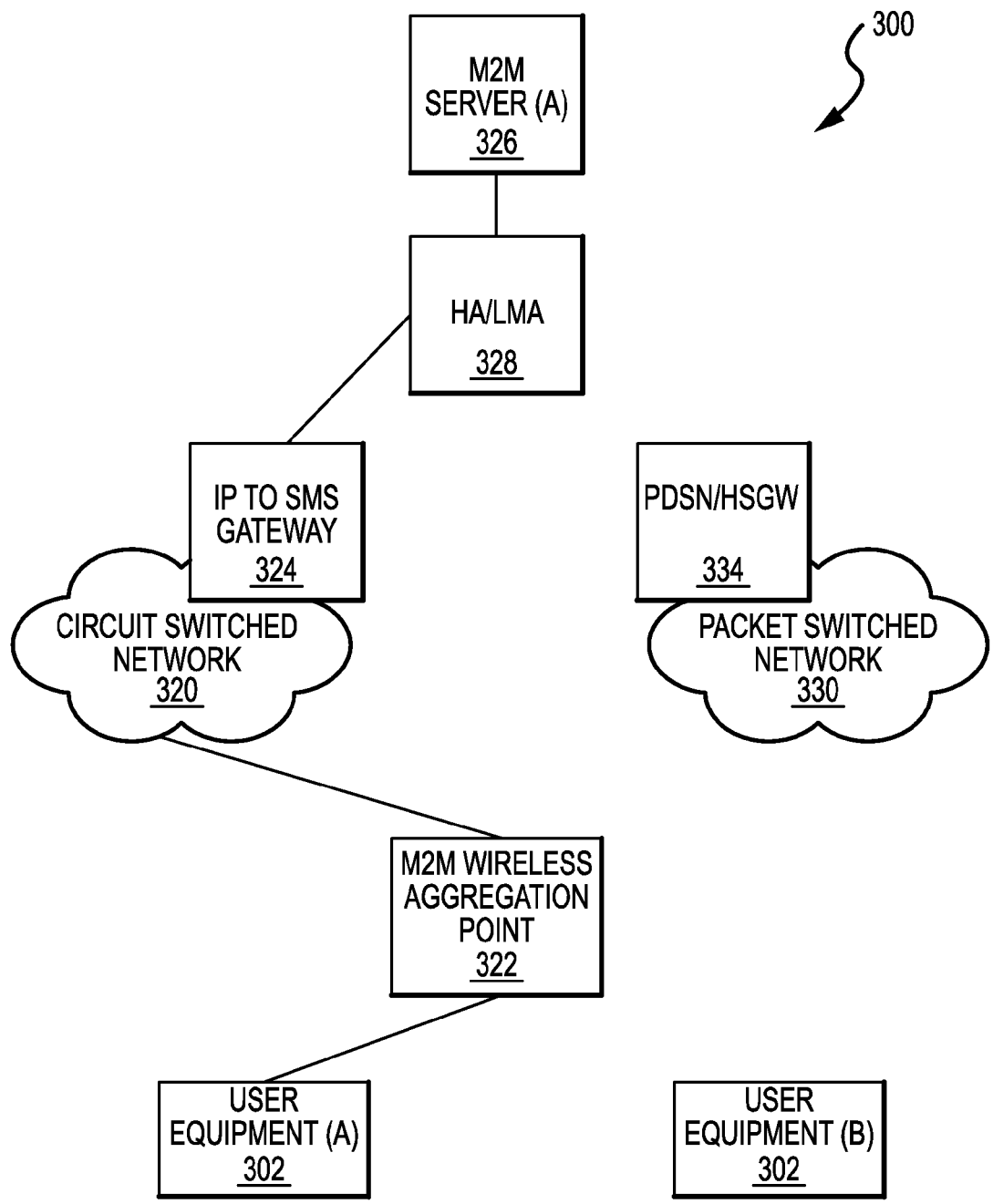
FIG. 3 illustrates a first example of a wireless communication system implementing a machine-to-machine (M2M) service.

FIG. 3 illustrates a first example of a wireless communication system 300 implementing a machine-to-machine (M2M) service. In one aspect, the wireless communication system 300 may include multiple UEs 302, a M2M wireless aggregation point 322, a circuit switched network 320 with an associated Internet Protocol (IP) to a short message service (SMS) gateway 324, a packet switched network 330 with an associated packet data serving node/high rate packet data (HRPD) serving gateway (PDSN/HSGW) 334, a home agent/local mobility agent (HA/LMA) 328, and a M2M server 326. As illustrated in the example of FIG. 3, communications may be performed between the M2M server 326 and a selected UE 302 through the circuit switched network 320.

Further, in such an aspect, the M2M wireless aggregation point 322 may be assigned a "IPv6 prefix" from a HA-pool of addresses. The M2M Server 326 may send an IP packet to UE (A) 302. In operation, HA/LMA 328 may determine whether the M2M wireless aggregation point 322 is reachable via a Packet Switched Network. If the M2M wireless aggregation point 322 is not reachable via the Packet Switched Network (for example, there is no mobile IP session setup between M2M Wireless Aggregation Point 322 and HA/LMA 328, then the HA/LMA 328 may convert the IP packet into an SMS format and forward the packet to SMS Gateway 324. Furthermore, the IP to SMS Gateway 324 may be treated as a home link. In other words, if there is no mobile IP session setup between M2M Wireless Aggregation Point 322 and HA/LMA 328, the HA/LMA 328 assumes that tunnel to SMS Gateway 324 is the home link for the M2M Wireless Aggregation Point 322. In this configuration, the link between HA/LMA 328 and SMS Gateway 324 is a Mobile IP tunnel. After the IP packet arrives at the M2M wireless aggregation point 322, it may be decapsulated and communicated to the target UE (A) 302.

Figure 4:
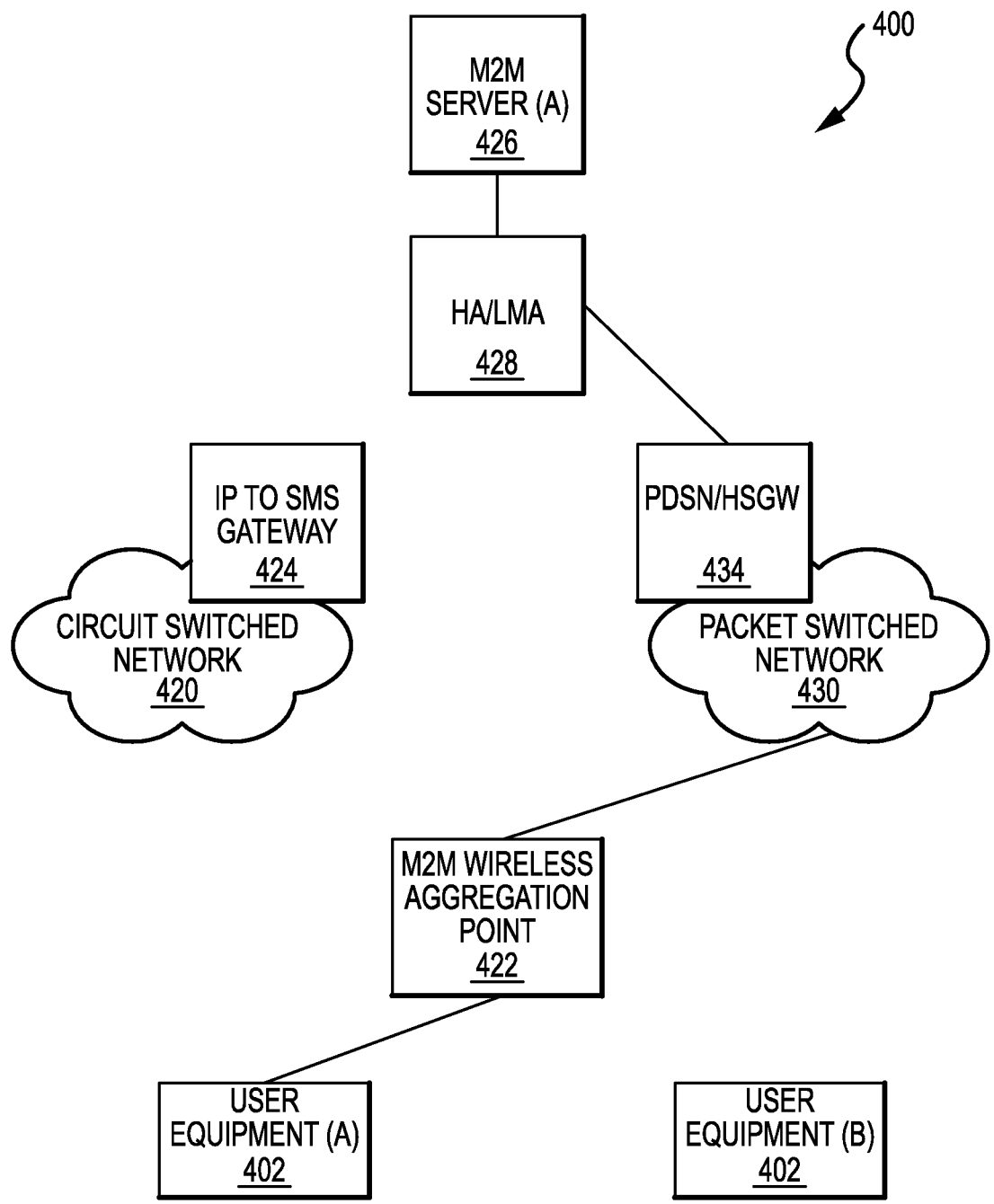
FIG. 4 illustrates a second example of a wireless communication system implementing a machine-to-machine (M2M) service.

FIG. 4 illustrates a second example of a wireless communication system 400 implementing a machine-to-machine (M2M) service. In one aspect, the wireless communication system 400 may include multiple UEs 402, a M2M wireless aggregation point 422, a circuit switched network 420 with an associated IP to SMS gateway 424, a packet switched network 430 with an associated PDSN/HSGW 434, a HA/LMA 428, and a M2M server 426. As illustrated in FIG. 4, communications may be performed between the M2M server 426 and a selected UE 402 through the packet switched network 430.

In one example, the M2M wireless aggregation point 422 may be assigned a "IPv6 prefix" from a HA-pool of addresses. The M2M Server 426 may send an IP packet to the UE (A) 402. In operation, HA/LMA 428 may determine whether the M2M wireless aggregation point 422 is reachable via a Packet Switched Network 430. If the M2M wireless aggregation point 422 is reachable via the Packet Switched Network 430, then the HA/LMA 428 may forward the IP packet to M2M wireless aggregation point 422 using Packet Switched Network 430. After the IP packet arrives at the M2M wireless aggregation point 422 it may be routed to the target UE (A) 402. In one aspect, FIG. 3 and FIG. 4 illustrate similar architectures with two configurations based on whether a SMS or a Packet-data connection is used.

Figure 5:
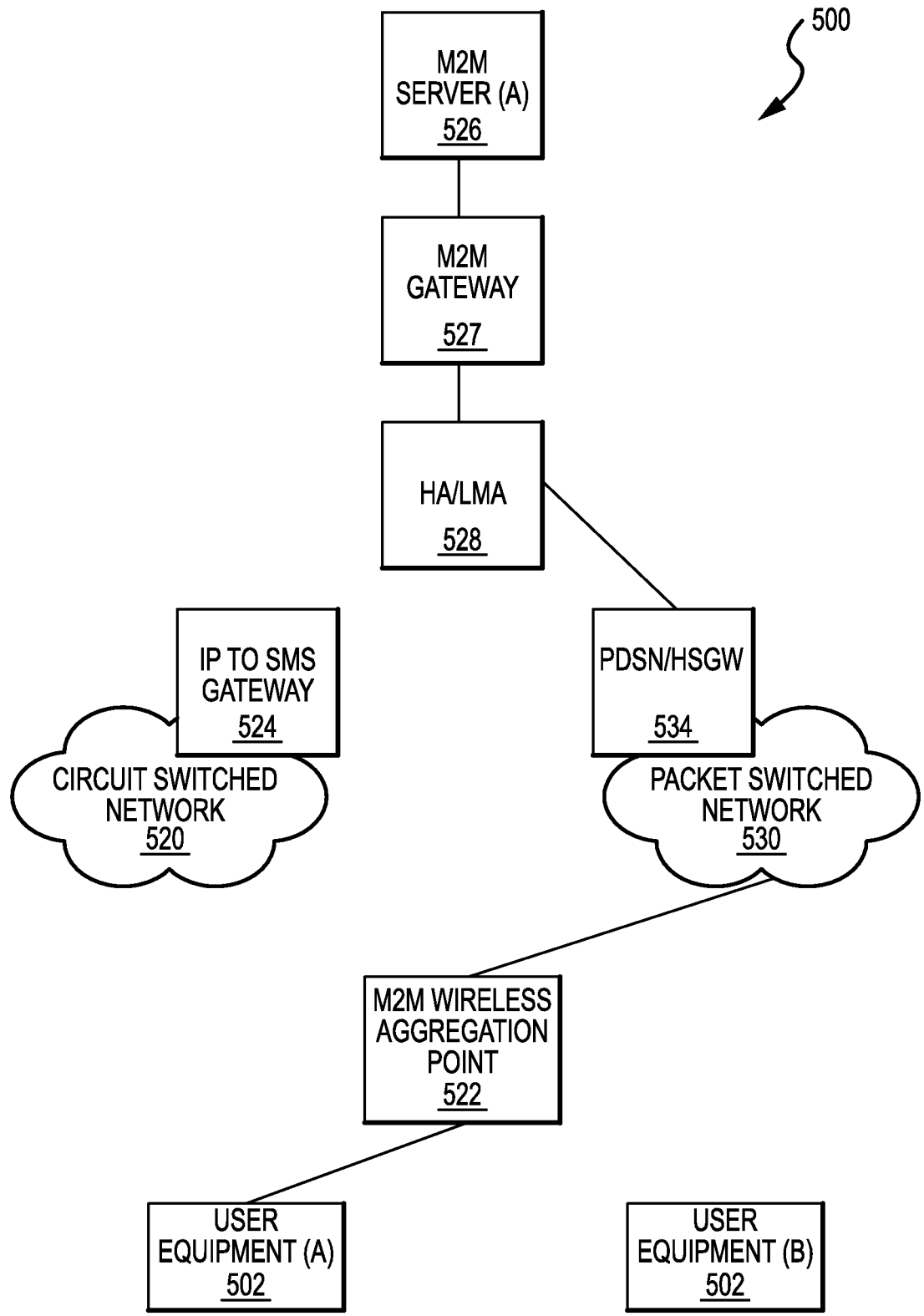
FIG. 5 illustrates a third example of a wireless communication system implementing a machine-to-machine (M2M) service.

FIG. 5 illustrates a third example of a wireless communication system 500 implementing a machine-to-machine (M2M) service. The wireless communication system 500 may include multiple UEs 502, a M2M wireless aggregation point 522, a circuit switched network 520 with an associated IP to SMS gateway 524, a packet switched network 530 with an associated PDSN/HSGW 534, a HA/LMA 528, a M2M gateway 530, and a M2M server 526. As illustrated in FIG. 5, communications may be performed between the M2M server 526 and a selected UE 502 through the packet switched network 530. In this aspect, the M2M-Gateway 527 may send the packets received from M2M Server 526 to the HA/LMA 528 or SMS Gateway 524. M2M Gateway 527. Determination of optimum air interface technology includes, but not limited to (a) whether the device has a packet data connection already setup, (b) network loading conditions of each of the air interface technology, (c) efficiency of delivery, (d) policy on which air interface technology is preferable, (e) cost of using a particular technology.

Further, in such an aspect, the M2M wireless aggregation point 522 may be assigned a "IPv6 prefix" from a HA-pool of addresses. Additionally, an IP tunnel may be setup between the M2M Server 526 and the M2M-Gateway 527 In one example, the M2M wireless aggregation point 522 may exchange signaling with M2M-Gateway 527 regarding the preferred communication link (e.g., SMS vs. IP, etc.). The M2M gateway 527 may encapsulate an IP packet received from M2M Server 526 in an appropriate transport and forward it to the appropriate UE (A) 502.

Figure 6:
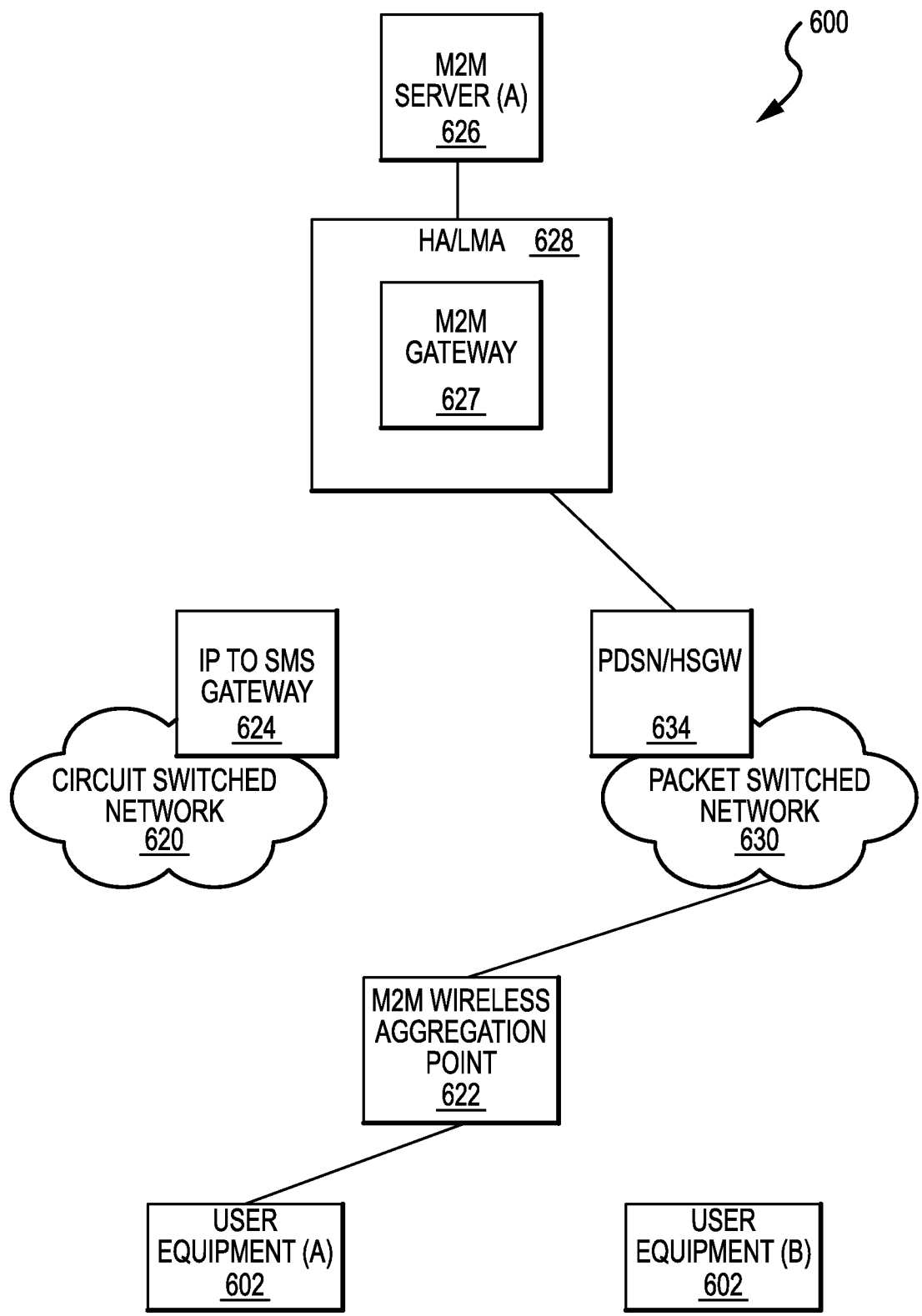
FIG. 6 illustrates a fourth example of a wireless communication system implementing a machine-to-machine (M2M) service.

FIG. 6 illustrates a fourth example of a wireless communication system 600 implementing a machine-to-machine (M2M) service. In one aspect, the wireless communication system 600 may include multiple UEs 602, a M2M wireless aggregation point 622, a circuit switched network 620 with an associated IP to SMS gateway 624, a packet switched network 630 with an associated PDSN/HSGW 634, a HA/LMA 628 with an associated M2M gateway 627, and a M2M server 626. As illustrated in FIG. 6, communications may be performed between the M2M server 626 and a selected UE 602 through the packet switched network 630.

In one aspect, the M2M wireless aggregation point 622 may be assigned a "IPv6 prefix" from a HA-pool of addresses. Additionally, an IP tunnel may be setup between the M2M Server 626 and the M2M Gateway 627, wherein the M2M gateway 627 is co-located with home agent/local mobility anchor (HA/LMA) 628. Thereafter, if an IP link is available, the HA/LMA 628 may forward packets in packet based network 630. Otherwise, HA/LMA 628 may pass the Internet Protocol (IP) packet to a short messaging service (SMS) conversion application, which may also be collocated with the HA/LMA 628 (not shown). In one aspect, FIG. 5 and FIG. 6 illustrate similar architecture with two configurations based on whether a SMS or a Packet-data connection is used.

Figure 7:
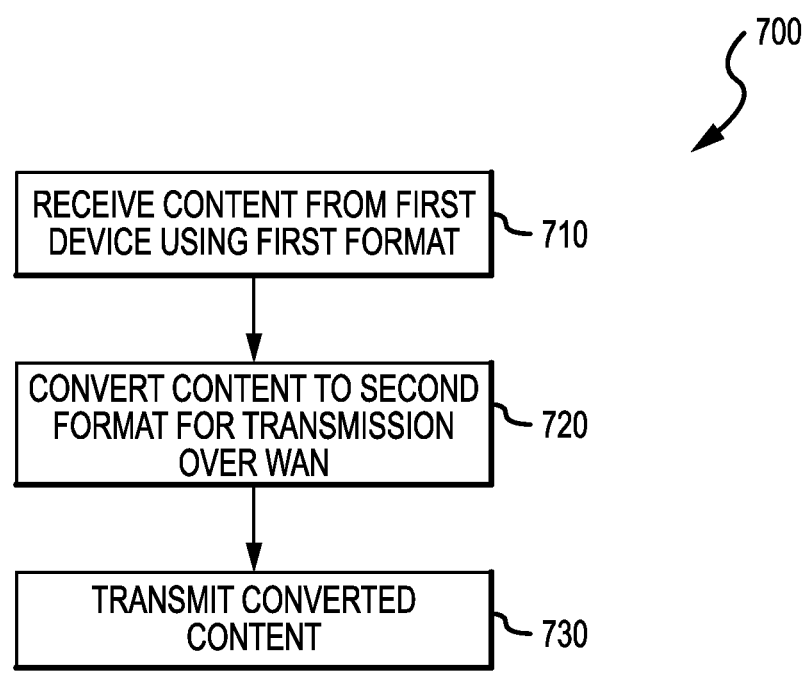
FIG. 7 illustrates an example flow diagram for providing uniform addressing for machine-to-machine (M2M) services.

FIG. 7 illustrates an example flow diagram for providing uniform addressing for Machine-to-machine (M2M) services. In block 710, receive content from a first device using a first format. In one aspect, a first M2M module may receive content from a first M2M device using a first format, wherein the content is addressed for transmission to a second M2M device over a wireless WAN. In one example, the first format is an Internet Protocol (IP) based format.

In block 720, convert the received content to a second format for transmission over the WAN. In one example, the first M2M module may convert the received content to a second format for transmission over the WAN to a second M2M module, wherein the second M2M module is operable to convert the content back to the first format for transmission to the second M2M device. In one aspect, the first M2M module is a M2M wireless gateway, the first M2M device is a M2M server, the second M2M module is a M2M aggregation point, and the second M2M device is a UE. In another aspect, the first M2M module is a M2M aggregation point, the first M2M device is a UE, the second M2M module is a M2M wireless gateway, and the second M2M device is a M2M server. In another aspect, the second format may be a circuit switched based format, or a packet switched based format. In another aspect, the WAN is either a circuit switched network or a packet switched network. In yet another aspect, the M2M wireless gateway may include an Internet Protocol (IP) to short message service (SMS) gateway, a packet data serving node/high rate packet data (HRPD) gateway (PDSN/HSGW) or a home agent/local mobility agent (HA/LMA).

In one aspect, the converting may further include using Internet Protocol (IP) to short message service (SMS) tunneling to tunnel the first format through the second format. In another aspect, the converting may further include using client mobile Internet protocol/proxy mobile Internet protocol (CMIP/PMIP) tunneling to tunnel the first format through the second format. In one example, the first M2M module is a M2M aggregation point, the first M2M device is a UE, and the first format may include an IP prefix common to any UEs accessible through the M2M aggregation point. In one example, the IP address overhead may be reduced using an IP address mapped to an air-interface identifier, an IP address 5-tuple mapped to an air-interface identifier, etc.

In block 730, transmit the converted content. In one example, the first M2M module may transmit the converted content to the second M2M device through the second M2M module. In one aspect, the first M2M device uses an optimum air interface technology. And, in one example, a M2M gateway chooses the optimum air interface technology for use by the first M2M device. In one aspect, the first format is an Uniform Resource Locator (URL) based format. In one aspect, the second format is a circuit switched based format or a packet switched based format.

Figure 8:
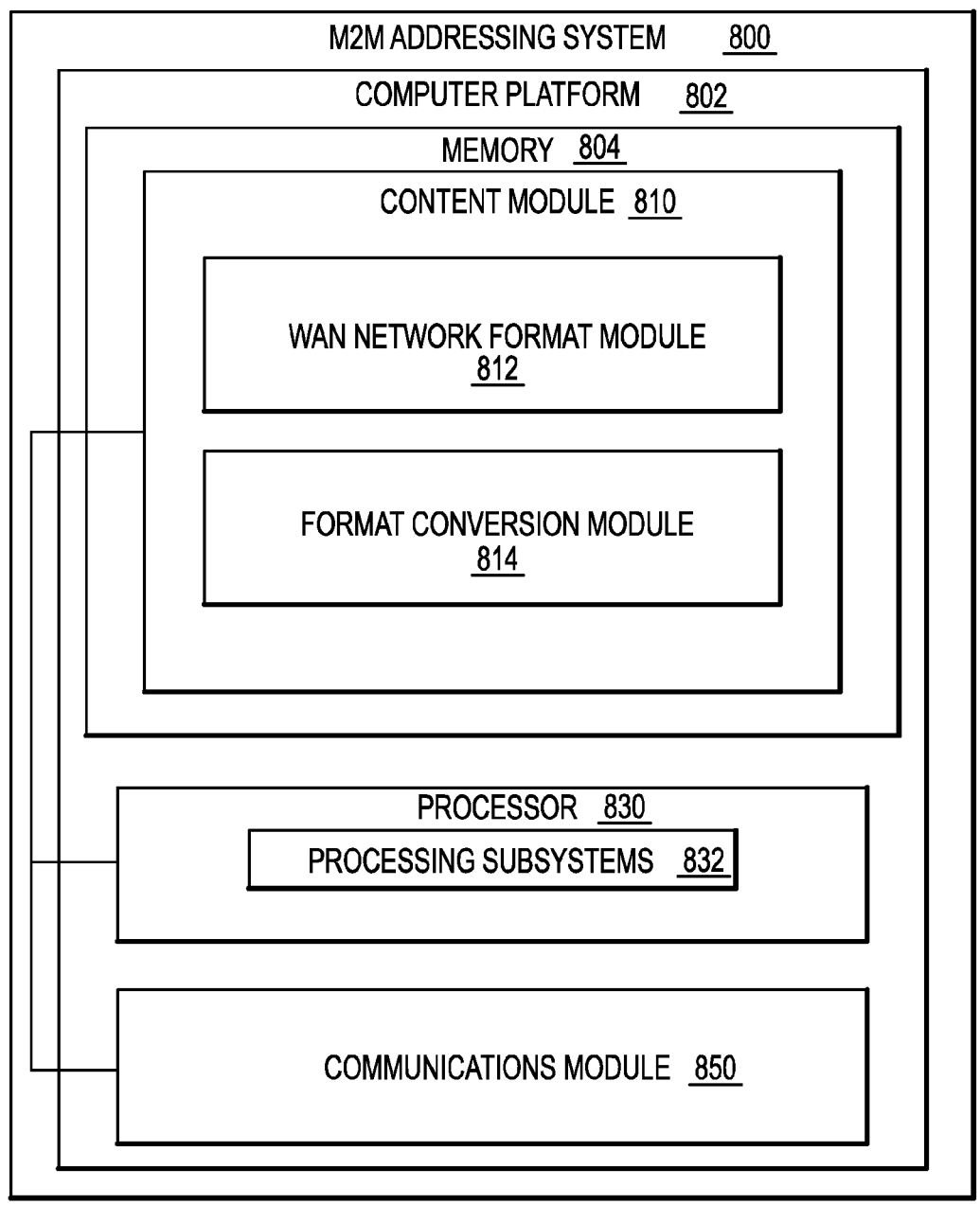
FIG. 8 illustrates an example block diagram for providing uniform addressing for M2M services.

FIG. 8 illustrates an example block diagram providing uniform addressing for M2M services. With reference to FIG. 8, illustrated is a detailed block diagram of M2M addressing system 800, such as M2M wireless aggregation point (222, 232), and M2M wireless gateway (224, 234) depicted in FIG. 2. The M2M addressing system 800 may include at least one of any type of hardware, server, personal computer, minicomputer, mainframe computer or any computing device either special purpose or general computing device. Further, the modules and applications described herein as being operated on or executed by M2M addressing system 800 may be executed entirely on a single network device, as shown in FIG. 2, or alternatively, in other aspects, separate servers, databases or computer devices may work in concert to provide data in usable formats to parties, and/or to provide a separate layer of control in the data flow between UEs 202, M2M servers 226, 236 and the modules and applications executed by M2M addressing system 800.

In the illustrated example, the M2M addressing system 800 includes a computer platform 802 that can transmit and receive data across wired and wireless networks and that can execute routines and applications. The computer platform 802 includes memory 804, which may comprise volatile and nonvolatile memory such as read-only and/or random-access memory (ROM and RAM), EPROM, EEPROM, flash cards or any memory common to computer platforms. The memory 804 may include one or more flash memory cells or may be any secondary or tertiary storage device, such as magnetic media, optical media, tape, or soft or hard disk. Furthermore, the computer platform 802 includes a processor 830, which may be an application-specific integrated circuit ("ASIC"), or other chipset, logic circuit, or other data processing device. The processor 830 may include various processing subsystems 832 embodied in hardware, firmware, software, and combinations thereof, that enable the functionality of the M2M addressing system on a wired or wireless network.

As illustrated in FIG. 8, the computer platform 802 further includes communications module 850 which may be embodied in hardware, firmware, software, and combinations thereof. In one aspect, the communications module 850 enables communications among the various components of M2M addressing system 800, as well as between M2M addressing system 800, UEs 202 and M2M servers 226, 236. The communications module 850 may include the requisite hardware, firmware, software and/or combinations thereof for establishing a wireless communication connection. According to described aspects, the communications module 850 may include the necessary hardware, firmware and/or software to facilitate wireless broadcast, multicast and/or unicast communication of requested content items, control information, applications, etc.

The memory 804 of the M2M addressing system 800 includes content module 810 operable for supporting M2M communications. In one aspect, the content module 810 may include WAN network format module 812 and format conversion module 814. The WAN network format module 812 may be operable to determine the format used by an underlying WAN. The format conversion module 814 may be operable to take an initial format of a content item and convert it to be able to be communicated over the underlying WAN. For example, for communications from a UE to a M2M server, if the underlying WAN uses a packet data Service (IP addressing in WAN), the M2M wireless aggregation point and the M2M wireless gateway will act as routers. In another example, for communications from a UE, if the underlying WAN uses circuit switched mode (e.g., SMS), the M2M wireless aggregation point and the M2M wireless gateway may convert and reconvert the IP address to WAN specific address mode (e.g., IMSI etc.) and out of the WAN specific address mode.

One skilled in the art would understand that the steps disclosed in the example flow diagram in FIG. 7 may be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art. In one aspect, the computer-readable medium includes non-transitory computer-readable medium.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 9:
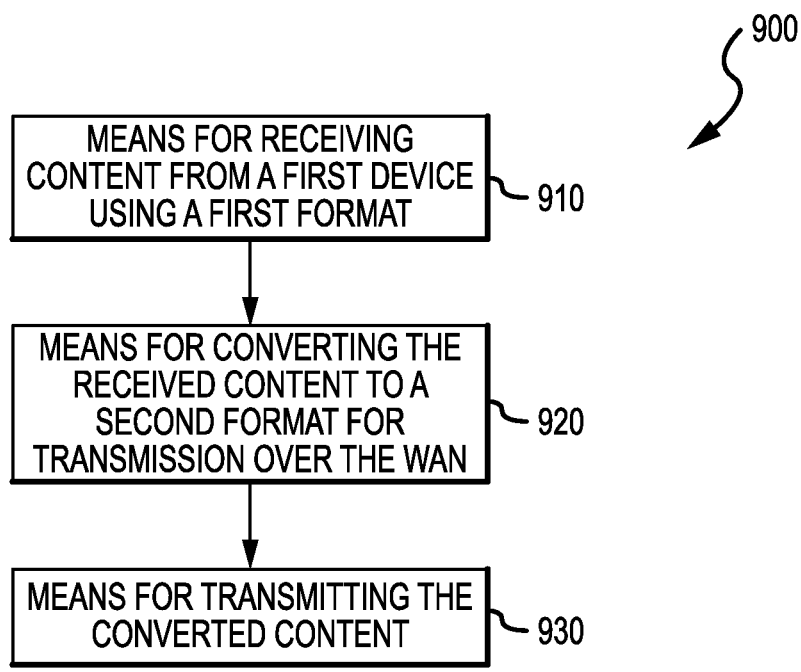
FIG. 9 illustrates an example of a device suitable for providing uniform addressing for machine-to-machine (M2M) services.

FIG. 9 illustrates an example of a device 900 suitable for providing uniform addressing for Machine-to-machine (M2M) services. In one aspect, the device 900 is implemented by at least one processor comprising one or more modules configured to provide different aspects of providing uniform addressing for Machine-to-machine (M2M) services as described herein in blocks 910, 920 and 930. For example, each module includes hardware, firmware, software, or any combination thereof. In one aspect, the device 900 is also implemented by at least one memory in communication with the at least one processor.

Figure 10:
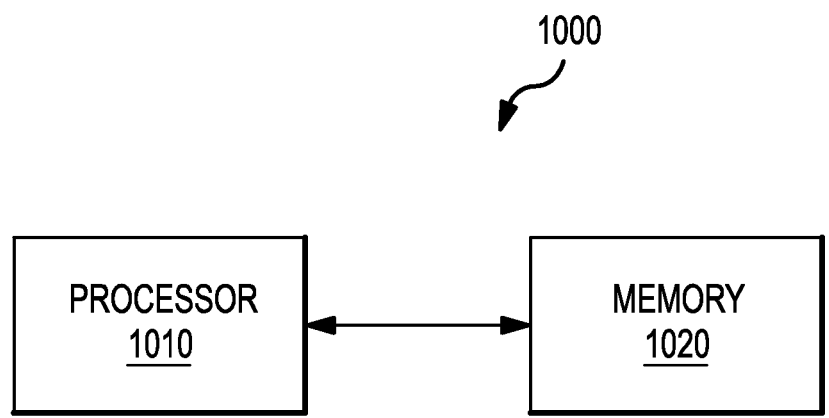
FIG. 10 illustrates an example of a device including a processor in communication with a memory for executing the processes for providing uniform addressing for machine-to-machine (M2M) services.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 10 illustrates an example of a device 1000 including a processor 1010 in communication with a memory 1020 for executing the processes for providing uniform addressing for Machine-to-machine (M2M) services. In one example, the device 1000 is used to implement the algorithm illustrated in FIG. 7. In one aspect, the memory 1020 is located within the processor 1010. In another aspect, the memory 1020 is external to the processor 1010. In one aspect, the processor includes circuitry for implementing or performing the various flow diagrams, logical blocks and/or modules described herein.

Figure 11:
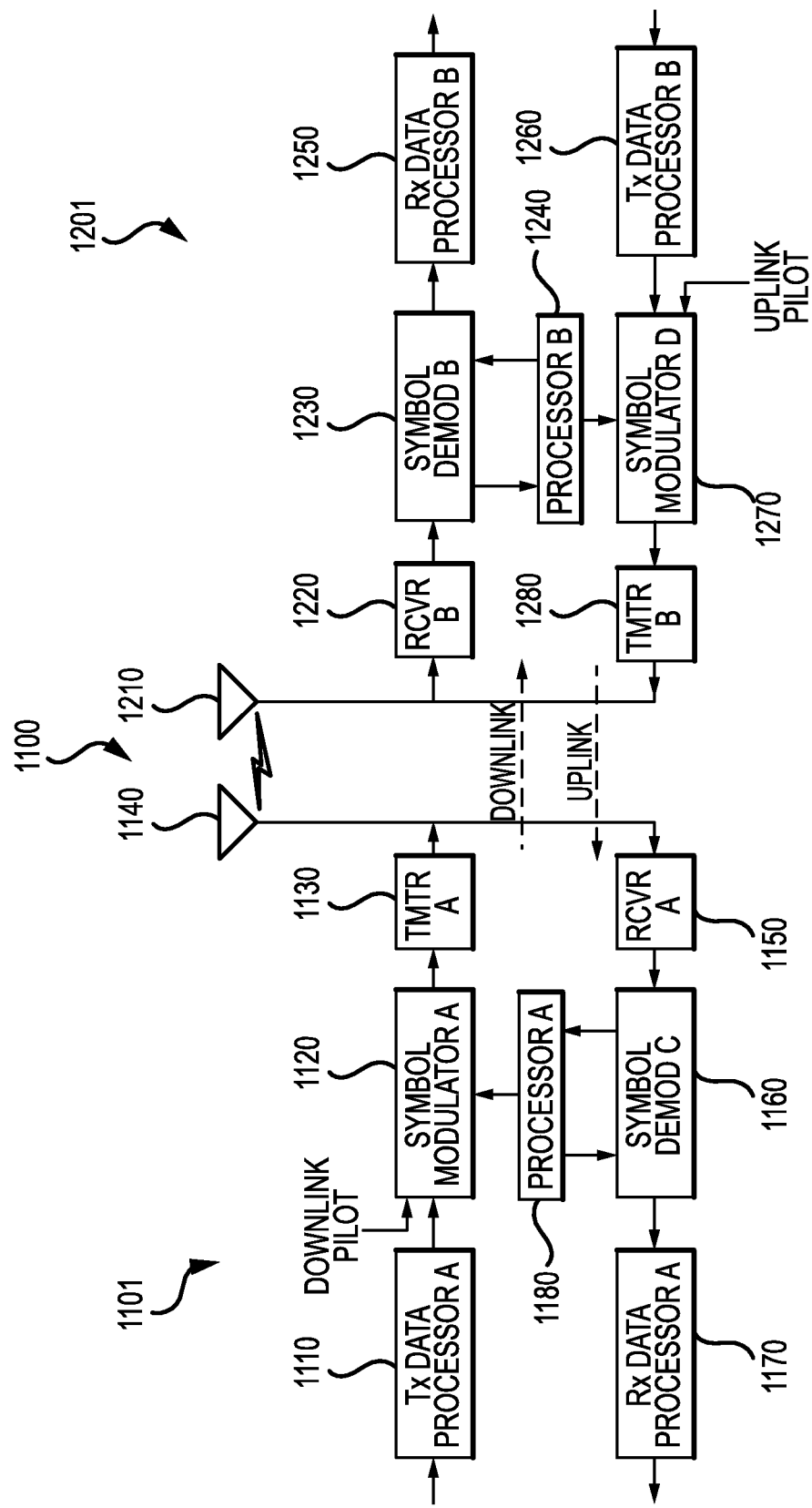
FIG. 11 illustrates an example block diagram of a two terminal system, for example, a node/user system.

FIG. 11 illustrates an example block diagram of a two terminal system, for example, a node/user system 1100. In one example of a wireless architecture, the node is either a M2M wireless aggregation point (222, 232) or a M2M wireless gateway (224, 234), and the user is either a user equipment (202) or a machine-to-machine (M2M) server (226, 236), as illustrated in FIG. 2.

One skilled in the art would understand that the example node/user system 1100 illustrated in FIG. 11 may be implemented in an FDMA environment, an OFDMA environment, a CDMA environment, a WCDMA environment, a TDMA environment, a SDMA environment or any other suitable wireless environment.

The node/user system 1100 includes a node 1101 (e.g., base station) and a user equipment or UE 1201 (e.g., wireless communication device). In the downlink leg, the node 1101 includes a transmit (TX) data processor A 1110 that accepts, formats, codes, interleaves and modulates (or symbol maps) traffic data and provides modulation symbols (e.g., data symbols). The TX data processor A 1110 is in communication with a symbol modulator A 1120. The symbol modulator A 1120 accepts and processes the data symbols and downlink pilot symbols and provides a stream of symbols. In one aspect, it is the symbol modulator A 1120 that modulates (or symbol maps) traffic data and provides modulation symbols (e.g., data symbols). In one aspect, symbol modulator A 1120 is in communication with processor A 1180 which provides configuration information. Symbol modulator A 1120 is in communication with a transmitter unit (TMTR) A 1130. The symbol modulator A 1120 multiplexes the data symbols and downlink pilot symbols and provides them to the transmitter unit A 1130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 1130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the user 1201 includes antenna 1210 for receiving the analog downlink signal and inputting the analog downlink signal to a receiver unit (RCVR) B 1220. In one aspect, the receiver unit B 1220 conditions, for example, filters, amplifies, and frequency downconverts the analog downlink signal to a first "conditioned" signal. The first "conditioned" signal is then sampled. The receiver unit B 1220 is in communication with a symbol demodulator B 1230. The symbol demodulator B 1230 demodulates the first "conditioned" and "sampled" signal (e.g., data symbols) outputted from the receiver unit B 1220. One skilled in the art would understand that an alternative is to implement the sampling process in the symbol demodulator B 1230. The symbol demodulator B 1230 is in communication with a processor B 1240. Processor B 1240 receives downlink pilot symbols from symbol demodulator B 1230 and performs channel estimation on the downlink pilot symbols. In one aspect, the channel estimation is the process of characterizing the current propagation environment. The symbol demodulator B 1230 receives a frequency response estimate for the downlink leg from processor B 1240. The symbol demodulator B 1230 performs data demodulation on the data symbols to obtain data symbol estimates on the downlink path. The data symbol estimates on the downlink path are estimates of the data symbols that were transmitted. The symbol demodulator B 1230 is also in communication with a RX data processor B 1250.

The RX data processor B 1250 receives the data symbol estimates on the downlink path from the symbol demodulator B 1230 and, for example, demodulates (i.e., symbol demaps), deinterleaves and/or decodes the data symbol estimates on the downlink path to recover the traffic data. In one aspect, the processing by the symbol demodulator B 1230 and the RX data processor B 1250 is complementary to the processing by the symbol modulator A 1120 and TX data processor A 1110, respectively.

In the uplink leg, the UE 1201 includes a TX data processor B 1260. The TX data processor B 1260 accepts and processes traffic data to output data symbols. The TX data processor B 1260 is in communication with a symbol modulator D 1270. The symbol modulator D 1270 accepts and multiplexes the data symbols with uplink pilot symbols, performs modulation and provides a stream of symbols. In one aspect, symbol modulator D 1270 is in communication with processor B 1240 which provides configuration information. The symbol modulator D 1270 is in communication with a transmitter unit B 1280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 1280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 1210.

The analog uplink signal from user 1201 is received by antenna 1140 and processed by a receiver unit A 1150 to obtain samples. In one aspect, the receiver unit A 1150 conditions, for example, filters, amplifies and frequency downconverts the analog uplink signal to a second "conditioned" signal. The second "conditioned" signal is then sampled. The receiver unit A 1150 is in communication with a symbol demodulator C 1160. One skilled in the art would understand that an alternative is to implement the sampling process in the symbol demodulator C 1160. The symbol demodulator C 1160 performs data demodulation on the data symbols to obtain data symbol estimates on the uplink path and then provides the uplink pilot symbols and the data symbol estimates on the uplink path to the RX data processor A 1170. The data symbol estimates on the uplink path are estimates of the data symbols that were transmitted. The RX data processor A 1170 processes the data symbol estimates on the uplink path to recover the traffic data transmitted by the user 1201. The symbol demodulator C 1160 is also in communication with processor A 1180. Processor A 1180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 1180 and processor B 1240 direct (i.e., control, coordinate or manage, etc.) operation at the node 1101 (e.g., base station) and at the user 1201, respectively. In one aspect, either or both processor A 1180 and processor B 1240 are associated with one or more memory units (not shown) for storing of program codes and/or data. In one aspect, either or both processor A 1180 or processor B 1240 or both perform computations to derive frequency and impulse response estimates for the uplink leg and downlink leg, respectively.

In one aspect, the node/user system 1100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for providing uniform addressing for machine-to-machine (M2M) services, the method comprising:

receiving, by a first M2M module, a content from a first M2M device using a first format that includes an Internet Protocol (IP) packet, wherein the content is addressed for transmission to a second M2M device, and wherein the first format comprises an IP prefix having one or both of an IP address mapped to an air-interface identifier or an IP address 5-tuple mapped to the air-interface identifier;

determining, by the first M2M module, whether a second M2M module associated with the second M2M device is reachable over a packed switched network;

determining, by the first M2M module, an air interface technology for transmitting the content over a wireless access network (WAN) to the second M2M device via the second M2M module based at least in part on determining whether the second M2M module is reachable over the packet switched network and on information indicating a preferred air interface technology received by the first M2M module from the second M2M module;

converting, by the first M2M module, the IP packet of the received content to a second format for transmission to the second M2M module over the WAN by encapsulating the IP packet into a second transport related to the second format, which is different from a first transport related to the first format, based at least in part on determining the preferred air interface technology for transmitting the content over the WAN, wherein the second M2M module is operable to convert the received content back to the first format of the IP packet for transmission to the second M2M device over the WAN; and transmitting, by the first M2M module, the converted content to the second M2M device through the second M2M module over the WAN.

2. The method of claim 1, wherein one or both of the first M2M device and the second M2M device uses an optimum air interface technology.

3. The method of claim 2, wherein one or both of the first M2M module and the second M2M module selects the optimum air interface technology for use by one or both of the first M2M device and the second M2M device.

4. The method of claim 2, wherein the optimum air-interface technology is selected based on one or more of (a) whether one or both of the first M2M device and the second M2M device has an established packet data connection, (b) one or more network loading conditions, (c) efficiency of delivery, (d) a preferred policy or (e) cost.

5. The method of claim 1, wherein the first M2M module comprises a M2M wireless gateway, the first M2M device comprises a M2M server, the second M2M module comprises a M2M aggregation point, and the second M2M device comprises a user equipment (UE).

6. The method of claim 1, wherein the first M2M module comprises a M2M aggregation point, the first M2M device comprises a UE, the second M2M module comprises a M2M wireless gateway, and the second M2M device comprises a M2M server.

7. The method of claim 1, wherein the first format further comprises a Uniform Resource Locator (URL) based format.

8. The method of claim 7, wherein the second format comprises a circuit switched based format or a packet switched based format.

9. The method of claim 7, wherein the second format is a circuit switched based format or a packet switched based format.

10. The method of claim 1, wherein the WAN comprises one of a circuit switched network or a packet switched network.

11. The method of claim 10, wherein the converting of the received content further comprises using IP to short message service (SMS) tunneling to tunnel the first format through the second format.

12. The method of claim 10, wherein the converting of the received content further comprises using client mobile Internet Protocol/proxy mobile Internet Protocol (CMIP/PMIP) tunneling to tunnel the first format through the second format.

13. The method of claim 1, wherein the first M2M module comprises a M2M aggregation point, the first M2M device comprises a UE, and the first format comprises an IP prefix common to any UEs accessible through the M2M aggregation point.

14. The method of claim 1, wherein the first M2M module comprises one of an IP to SMS gateway, a packet data serving node/high rate packet data (HRPD) gateway (PDSN/HSGW), or a home agent/local mobility agent (HA/LMA).

15. An apparatus for providing uniform addressing for machine-to-machine (M2M) services, the apparatus being a first M2M module and comprising a processor and a memory, the memory containing program code executable by the processor for performing the following:

receiving, by the first M2M module, a content from a first M2M device using a first format that includes an Internet Protocol (IP) packet, wherein the content is addressed for transmission to a second M2M device, and wherein the first format comprises an IP prefix having one or both of an IP address mapped to an air-interface identifier or an IP address 5-tuple mapped to the air-interface identifier;

determining, by the first M2M module, whether a second M2M module associated with the second M2M device is reachable over a packed switched network;

determining, by the first M2M module, an air interface technology for transmitting the received content over a wireless access network (WAN) to the second M2M device via the second M2M module based at least in part on determining whether the second M2M module is reachable over the packet switched network and on information indicating a preferred air interface technology received by the first M2M module from the second M2M module;

converting, by the first M2M module, the IP packet of the received content to a second format for transmission to the second M2M module over the WAN by encapsulating the IP packet into a second transport related to the second format, which is different from a first transport related to the first format, based at least in part on determining the preferred air interface technology for transmitting the content over the WAN, wherein the second M2M module is operable to convert the received content back to the first format of the IP packet for transmission to the second M2M device over the WAN; and transmitting, by the first M2M module, the converted content to the second M2M device through the second M2M module over the WAN.

16. The apparatus of claim 15, wherein one or both of the first M2M device and the second M2M device uses an optimum air interface technology.

17. The apparatus of claim 16, wherein one or both of the first M2M module and the second M2M module selects the optimum air interface technology for use by one or both of the first M2M device and the second M2M device.

18. The apparatus of claim 16, wherein the optimum air-interface technology is selected based on one or more of (a) whether one or both of the first M2M device and the second M2M device has an established packet data connection, (b)

one or more network loading conditions, (c) efficiency of delivery, (d) a preferred policy or (e) cost.

19. The apparatus of claim 15, wherein the first M2M module comprises a M2M wireless gateway, the first M2M device comprises a M2M server, the second M2M module comprises a M2M aggregation point, and the second M2M device comprises a user equipment (UE).

20. The apparatus of claim 15, wherein the first M2M module comprises a M2M aggregation point, the first M2M device comprises a UE, the second M2M module comprises a M2M wireless gateway, and the second M2M device comprises a M2M server.

21. The apparatus of claim 15, wherein the first format further comprises a Uniform Resource Locator (URL) based format.

22. The apparatus of claim 21, wherein the second format comprises a circuit switched based format or a packet switched based format.

23. The apparatus of claim 21, wherein the second format comprises a circuit switched based format or a packet switched based format.

24. The apparatus of claim 15, wherein the WAN comprises one of a circuit switched network or a packet switched network.

25. The apparatus of claim 24, wherein the memory further comprising program code for using IP to short message service (SMS) tunneling to tunnel the first format through the second format.

26. The apparatus of claim 24, wherein the memory further comprising program code for using client mobile Internet Protocol/proxy mobile Internet Protocol (CMIP/PMIP) tunneling to tunnel the first format through the second format.

27. The apparatus of claim 15, wherein the first M2M module comprises a M2M aggregation point, the first M2M device comprises a user equipment (UE), and the first format comprises an IP prefix common to any UEs accessible through the M2M aggregation point.

28. The apparatus of claim 15, wherein the first M2M module comprises one of an IP to SMS gateway, a packet data serving node/high rate packet data (HRPD) gateway (PDSN/HSGW), or a home agent/local mobility agent (HA/LMA).

29. An apparatus for providing uniform addressing for machine-to-machine (M2M) services, the apparatus being a first M2M module and comprising:
means for receiving, by the first M2M module, a content from a first M2M device using a first format that includes an Internet Protocol (IP) packet, wherein the content is addressed for transmission to a second M2M device, and wherein the first format comprises an IP prefix having one or both of an IP address mapped to an air-interface identifier or an IP address 5-tuple mapped to the air-interface identifier;
means for determining, by the first M2M module, whether a second M2M module associated with the second M2M device is reachable over a packed switched network;
means for determining, by the first M2M module, an air interface technology for transmitting the received content over a wireless access network (WAN) to the second M2M device via the second M2M module based at least in part on determining whether the second M2M module is reachable over the packet switched network and on information indicating a preferred air interface technology received by the first M2M module from the second M2M module;
means for converting, by the first M2M module, the IP packet of the received content to a second format for transmission to the second M2M module over the WAN by encapsulating the IP packet into a second transport related to the second format, which is different from a first transport related to the first format, based at least in part on determining the preferred air interface technology for transmitting the content over the WAN, wherein the second M2M module is operable to convert the received content back to the first format of the IP packet for transmission to the second M2M device over the WAN; and
means for transmitting, by the first M2M module, the converted content to the second M2M device through the second M2M module over the WAN.

30. The apparatus of claim 29, wherein one or both of the first M2M device and the second M2M device uses an optimum air interface technology.

31. The apparatus of claim 30, wherein one or both of the first M2M module and the second M2M module selects the optimum air interface technology for use by one or both of the first M2M device and the second M2M device.

32. The apparatus of claim 30, wherein the optimum air-interface technology is selected based on one or more of (a) whether one or both of the first M2M device and the second M2M device has an established packet data connection, (b) one or more network loading conditions, (c) efficiency of delivery, (d) a preferred policy or (e) cost.

33. The apparatus of claim 29, wherein the first M2M module comprises a M2M wireless gateway, the first M2M device comprises a M2M server, the second M2M module comprises a M2M aggregation point, and the second M2M device comprises a user equipment (UE).

34. The apparatus of claim 29, wherein the first M2M module comprises a M2M aggregation point, the first M2M device comprises a UE, the second M2M module comprises a M2M wireless gateway, and the second M2M device comprises a M2M server.

35. The apparatus of claim 29, wherein the first format comprises a Uniform Resource Locator (URL) based format.

36. The apparatus of claim 35, wherein the second format comprises a circuit switched based format or a packet switched based format.

37. The apparatus of claim 29, wherein the second format comprises a circuit switched based format or a packet switched based format.

38. The apparatus of claim 29, wherein the WAN comprises one of a circuit switched network or a packet switched network.

39. The apparatus of claim 38 further comprising means for using IP to short message service (SMS) tunneling to tunnel the first format through the second format.

40. The apparatus of claim 38 further comprising means for using client mobile Internet Protocol/proxy mobile Internet Protocol (CMIP/PMIP) tunneling to tunnel the first format through the second format.

41. The apparatus of claim 29, wherein the first M2M module comprises a M2M aggregation point, the first M2M device comprises a UE, and the first format comprises an IP prefix common to any UEs accessible through the M2M aggregation point.

42. The apparatus of claim 29, wherein the first M2M module comprises one of an IP to SMS gateway, a packet data serving node/high rate packet data (HRPD) gateway (PDSN/HSGW), or a home agent/local mobility agent (HA/LMA).

43. A non-transitory computer-readable medium associated with a first machine-to-machine (M2M) module and storing computer executable code for wireless communication, comprising code for:

receiving, by the first M2M module, a content from a first M2M device using a first format that includes an Internet Protocol (IP) packet, wherein the content is addressed for transmission to a second M2M device, and wherein the first format comprises an IP prefix having one or both of an IP address mapped to an air-interface identifier or an IP address 5-tuple mapped to the air-interface identifier;

determining, by the first M2M module, whether a second M2M module associated with the second M2M device is reachable over a packed switched network;

determining, by the first M2M module, an air interface technology for transmitting the received content over a wireless access network (WAN) to the second M2M device via the second M2M module based at least in part on determining whether the second M2M module is reachable over the packet switched network and on information indicating a preferred air interface technology received by the first M2M module from the second M2M module;

converting, by the first M2M module, the IP packet of the received content to a second format for transmission to the second M2M module over the WAN by encapsulating the IP packet into a second transport related to the second format, which is different from a first transport related to the first format, based at least in part on determining the preferred air interface technology for transmitting the content over the WAN, wherein the second M2M module is operable to convert the received content back to the first format of the IP packet for transmission to the second M2M device over the WAN; and transmitting, by the first M2M module, the converted content to the second M2M device through the second M2M module over the WAN.

44. The non-transitory computer-readable medium of claim 43, wherein one or both of the first M2M module and the second M2M module selects an optimum air interface technology for use by one or both of the first M2M device and the second M2M device, and wherein the optimum air-interface technology is selected based on one or more of (a) whether one or both of the first M2M device and the second M2M device has an established packet data connection, (b) one or more network loading conditions, (c) efficiency of delivery, (d) a preferred policy or (e) cost.

45. The method of claim 1, wherein determining the air-interface technology is further based on determining whether one or both of the first M2M device and the second M2M device have an established packet data connection.

46. The method of claim 1, wherein the second transport related to the second format comprises a short message service (SMS) transport.

47. The apparatus of claim 15, wherein determining the air-interface technology is further based on determining whether one or both of the first M2M device and the second M2M device have an established packet data connection.

48. The apparatus of claim 15, wherein the second transport related to the second format comprises a short message service (SMS) transport.

49. The apparatus of claim 29, wherein the means for determining the air-interface technology determines the air-interface technology further based on determining whether one or both of the first M2M device and the second M2M device have an established packet data connection.

50. The non-transitory computer-readable medium of claim 43, wherein the code for determining the air-interface technology determines the air-interface technology further based on determining whether one or both of the first M2M device and the second M2M device have an established packet data connection.

* * * * *